United States Patent
Cyr et al.

(10) Patent No.: US 10,625,612 B2
(45) Date of Patent: Apr. 21, 2020

(54) DEPLOYABLE VEHICLE INDUCTIVE CHARGING ASSEMBLY

(71) Applicant: Ford Global Technologies, LLC, Dearborn, MI (US)

(72) Inventors: Steven Michael Cyr, Lake Orion, MI (US); Raymond C. Siciak, Ann Arbor, MI (US); Michael Reibling, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 966 days.

(21) Appl. No.: 14/686,810

(22) Filed: Apr. 15, 2015

(65) Prior Publication Data

US 2016/0303980 A1 Oct. 20, 2016

(51) Int. Cl.
*B60L 11/18* (2006.01)
*B60L 53/38* (2019.01)
*B60L 53/12* (2019.01)

(52) U.S. Cl.
CPC ............ *B60L 11/182* (2013.01); *B60L 53/12* (2019.02); *B60L 53/38* (2019.02); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC ........ B60L 11/182; B60L 53/12; B60L 53/00; B60L 53/10; B60L 53/38; B60L 53/34; B60L 53/35
USPC ........................................................ 320/108
See application file for complete search history.

(56) References Cited

U.S. PATENT DOCUMENTS

| 5,617,003 | A | * | 4/1997 | Odachi | B60L 11/182 320/108 |
|---|---|---|---|---|---|
| 5,821,728 | A | * | 10/1998 | Schwind | H01M 10/44 320/108 |
| 5,821,731 | A | * | 10/1998 | Kuki | B60L 11/1805 320/108 |
| 6,014,597 | A | * | 1/2000 | Kochanneck | B60K 1/04 701/22 |
| 6,687,457 | B1 | * | 2/2004 | Dirisio | G03B 17/02 396/462 |
| 8,307,967 | B2 | * | 11/2012 | Patwardhan | H01R 13/629 191/2 |

(Continued)

FOREIGN PATENT DOCUMENTS

JP 63242105 A 10/1988

*Primary Examiner* — Drew A Dunn
*Assistant Examiner* — Tessema Kebede
(74) *Attorney, Agent, or Firm* — David B. Kelley; Brooks Kushman P.C.

(57) ABSTRACT

A charge plate receiver assembly for an electric vehicle includes an inductive charge plate receiver and a swing arm pivotally secured to a mounting surface. The charge plate receiver is pivotally secured to the swing arm such that the charge plate receiver travels along an arc defined by a length of the swing arm when the assembly moves between a retracted position and a deployed position. When retracted, the charge plate receiver may retract into a cavity, defined by under-body components. The charge plate receiver has a planar surface and the planar surface is generally perpendicular to a horizontal plane of the vehicle in the retracted position and parallel with the horizontal plane of the vehicle in the deployed position.

13 Claims, 3 Drawing Sheets

(56) References Cited

U.S. PATENT DOCUMENTS

| | | | |
|---|---|---|---|
| 2010/0031856 A1* | 2/2010 | Shoda | B60L 5/005 |
| | | | 108/21 |
| 2010/0235006 A1* | 9/2010 | Brown | B60L 11/182 |
| | | | 700/286 |
| 2011/0148350 A1* | 6/2011 | Wegener | B60L 11/182 |
| | | | 320/108 |
| 2011/0181240 A1 | 7/2011 | Baarman et al. | |
| 2011/0256737 A1* | 10/2011 | Lacour | B60L 3/0069 |
| | | | 439/34 |
| 2013/0249470 A1* | 9/2013 | Martin | B60L 11/182 |
| | | | 320/107 |
| 2014/0035520 A1 | 2/2014 | Nakayama | |
| 2014/0091757 A1 | 4/2014 | Proebstile et al. | |
| 2014/0292266 A1 | 10/2014 | Eger et al. | |
| 2015/0246616 A1* | 9/2015 | Ichikawa | B60L 53/36 |
| | | | 307/104 |

\* cited by examiner

DEPLOYABLE VEHICLE INDUCTIVE CHARGING ASSEMBLY

TECHNICAL FIELD

This disclosure relates to a vehicle inductive charging system for a traction battery, and in particular to a vehicle inductive charge plate assembly and structure.

BACKGROUND

Battery electric vehicles (BEV's) and plug in hybrid electric vehicles (PHEV's) (collectively referred to as EVs or xEVs) may use an electric motor as their primary or only source of motive power. A BEV or PHEV typically requires an external power source in order to charge the vehicle mounted battery pack which powers the motor.

Increasing popularity and sales of battery electric vehicles (BEV's) and plug in hybrid electric vehicles (PHEV's) have led to advances in vehicle and charging system technology. The use of a charge cord to plug a vehicle into a power grid may be viewed as an inconvenience by potential BEV and PHEV owners. One way to allow the charging of a vehicle without having to physically plug the vehicle into a power grid is through the use of an inductive wireless charging system. Such inductive wireless charging systems are commonly used in electronic devices such as electric toothbrushes and cell phones. Inductive wireless charging systems are now being proposed for charging BEVs and PHEVs.

Inductive wireless charging uses an electromagnetic field to transfer energy from a transmitting coil on the ground to a receiving coil attached to the vehicle. The receiving coil required to charge a vehicle is much larger than what is required to charge a cell phone or a toothbrush. Larger coils can transfer more energy than smaller ones. It is often difficult to find enough room to package a large receiving coil under a vehicle.

The proximity of the two coils affects the efficiency of the energy transfer. It is desirable to locate the receiving coil along the center of the vehicle, so the operator can more easily park the vehicle over the transmitting coil. Locating the receiving coil in the center of the vehicle also keeps the operator and passersby away from the electromagnetic field generated by these large inductive charging coils. This further reduces options for easily packaging the transmitting coil on the underside of a vehicle.

SUMMARY

A vehicle includes an inductive charge plate assembly. The assembly includes a swing arm pivotally secured to a mounting surface and a charge plate receiver pivotally secured to the swing arm such that the charge plate receiver changes orientation from on-end to on-side and travels along an arc defined by a length of the swing arm when the assembly moves between retracted and deployed positions.

A vehicle includes an inductive charge plate assembly. The assembly includes a swing arm pivotally secured to a mounting surface and a charge plate receiver pivotally secured to the swing arm such that the charge plate receiver is disposed within a cavity defined by an under-body of the vehicle when the assembly is retracted, and travels along an arc defined by a length of the swing arm when the assembly moves between retracted and deployed positions.

An inductive charge plate assembly includes a charge plate receiver having a major planar surface and mechanically coupled with a swing arm such the charge plate receiver pivots relative to the swing arm as the swing arm rotates between a retracted and deployed position and the major planar surface achieves a perpendicular orientation relative to ground when the assembly is in a vehicle and in the retracted position.

DETAILED DESCRIPTION

Figure 1B:
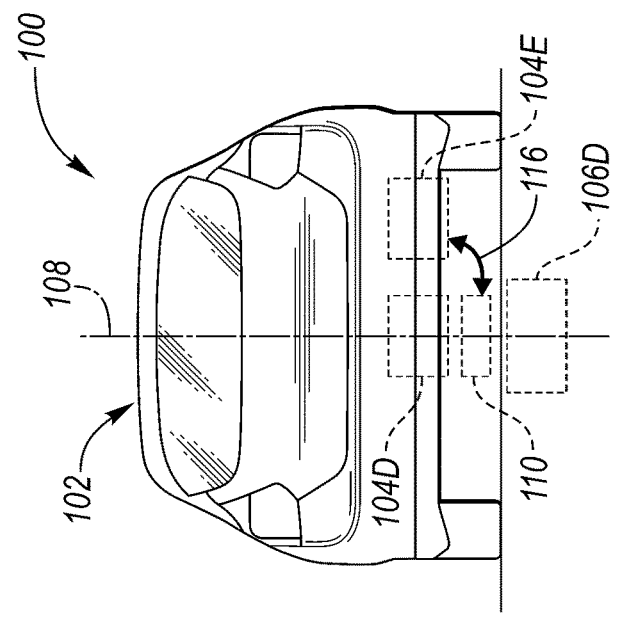
FIG. 1B is an exemplary rear view illustration showing locations of an inductive charge plate on a vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Typically, a manufacturer of a vehicle has a goal to reduce a weight of a vehicle as the weight is directly related to a fuel economy of the vehicle. Another aspect of concern for vehicle manufacturers is to reduce cost and complexity of the vehicle while meeting customer preferences and requirements. To reduce weight, cost, and complexity, many inductive charge systems for xEVs are structured with a stationary charge plate receiver on the vehicle and a charge plate transmitter at the charge station is capable of motion to align the charge plate receiver and transmitter. The charge plate transmitter may move proximate to the charge plate receiver during a charge cycle to improve the transfer of energy. This structure allows for a low weight, low cost and robust mounting of the charge plate receiver on the vehicle.

Here, an alternative inductive charge plate assembly is disclosed in which a charge plate receiver is coupled to the vehicle via a mechanism including a swing arm. The swing arm may be configured as a robust mechanism that allows rapid motion of the charge plate receiver from a stored position to a deployed position. The deployed position is a position in which the charge plate is ready for use and the stored position is used to house, protect and secure the charge plate receiver when the vehicle is not being charged including when the vehicle is on motion.

In one embodiment, a charge plate receiver is ready for use when the charge plate receiver is extended away from the underbody of the vehicle such that it may be proximate to a charge plate transmitter flush or substantially flush with the ground surface under the vehicle. In the deployed position, the charge plate receiver may be held substantially level with the horizon or a horizontal plane on which the vehicle is resting. This embodiment also includes a stored position, also referred to as the retracted position, that includes a position in which the charge plate receiver is retracted back close to the body of the vehicle or drawn into a cavity of the vehicle such that a vehicle clearance between components on the underside of the vehicle and the horizontal plane on which the vehicle rests is greater than a predetermined distance. The orientation of the charge plate receiver may change between the stored and deployed positions or the orientation may remain substantially the same. For example, in one embodiment, a charge plate receiver may be in a horizontal position when deployed and rotate to a vertical position when stored. Storage in a vertical position may utilize underbody cavities and voids. In an alternative embodiment, the charge plate receiver may remain horizontal in both the deployed and stored positions.

Another advantage of the use of a swing arm may be that the charge plate receiver location may be offset from the location of the charge plate receiver in the deployed position. The importance of this is that often charge plate transmitters are typically located near a medial axis or median plane of the vehicle or a parking space of a vehicle. The median plane of the vehicle divides the vehicle vertically through the midline into substantially equal halves. The vehicle however has powertrain components including engine, transmission, driveshaft, and axles occupying the underbody in and near the median plane of the vehicle. Here, the use of the swing arm allows the storage position or storage location to be offset from the median plane of the vehicle. The offset may be greater than the size of the charge plate receiver such that the charge plate receiver does not intersect the medial plane of the vehicle. And the deployed position or deployed location may be centered on the medial plane of the vehicle or intersecting the medial plane of the vehicle.

Figure 1A:
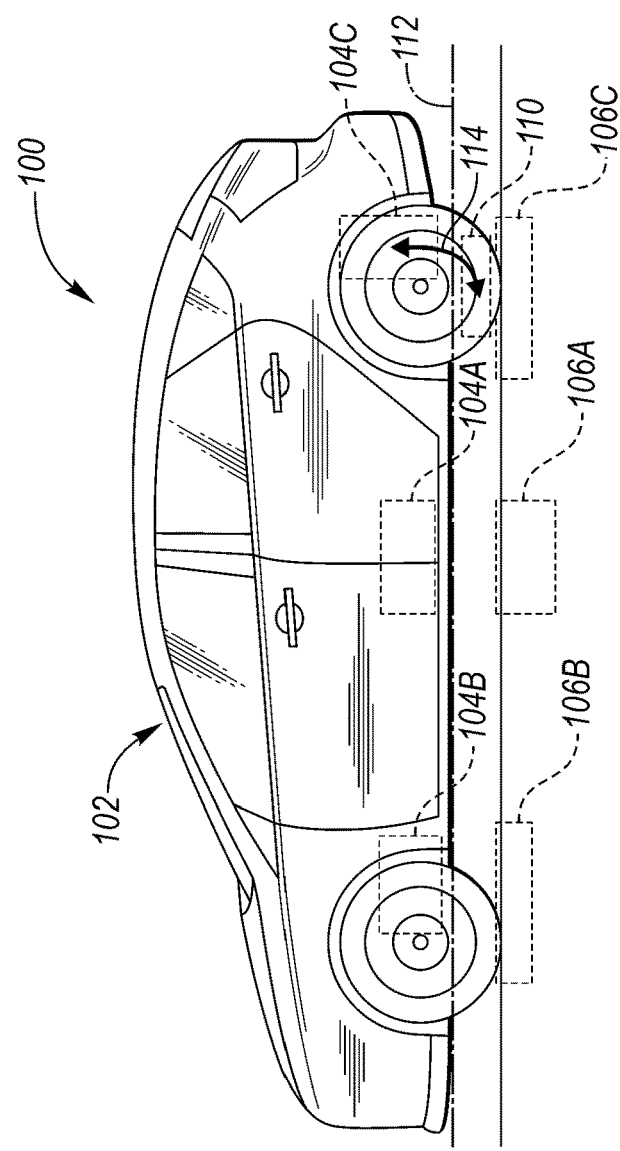
FIG. 1A is an exemplary side view illustration showing locations of an inductive charge plate on a vehicle.

FIG. 1A is an exemplary side view illustration showing locations of an inductive charge plate on a vehicle. An inductive charge system 100 includes a vehicle 102, a receiver location 104 capable of supporting and housing an inductive charge plate assembly and a charge plate transmitter location 106 where an inductive charge plate transmitter is configured to emit energy such as electromagnetic energy to be captured by the charge plate receiver when the charge plate receiver is in a deployed location such as deployed location 110. A first embodiment is illustrated in which a charge plate assembly location 104A is located near the center or passenger area of a vehicle allowing a vehicle to inductively couple with a charge plate transmitter located at a central location 106A of a charge station parking space. A second embodiment is illustrated in which a charge plate assembly location 104B is located near the engine compartment allowing a vehicle to inductively couple with a charge plate transmitter located at a front location 106B of a charge station parking space. A third embodiment is illustrated in which a charge plate assembly location 104C is located near the rear of a vehicle allowing the vehicle to inductively couple with a charge plate transmitter located at a rear area 106C of a charge station parking space. FIG. 1A also illustrates a ground clearance line 112 above which the charge plate receiver is stored when in the retracted position. The charge plate receiver moves below the clearance line 112 when deployed. For example, a charge plate may travel along an arc 114 to move from a retracted position to deployed position 110 to couple with a charge plate transmitter located at rear area 106C of a charge station parking space.

FIG. 1B is an exemplary rear view illustration showing locations of an inductive charge plate on a vehicle. The inductive charge system 100 includes a vehicle 102, a receiver location 104 capable of supporting and housing an inductive charge plate assembly and a charge plate transmitter location 106. In one embodiment, both a charge plate assembly location 104D and a charge station transmitter location 106D are located intersecting the medial plane of the vehicle 102. In another embodiment, a charge station transmitter location 106D is located intersecting the medial plane of the vehicle 102 and a charge plate assembly location 104D is offset from the medial plane 108 such that the charge plate receiver does not intersect the medial plane 108. In this embodiment, the charge plate receiver would have to swing along an arc 116 when moving between a stored location and a deployed location 104E to couple with the charge plate transmitter located at location 106D.

Figure 2A:
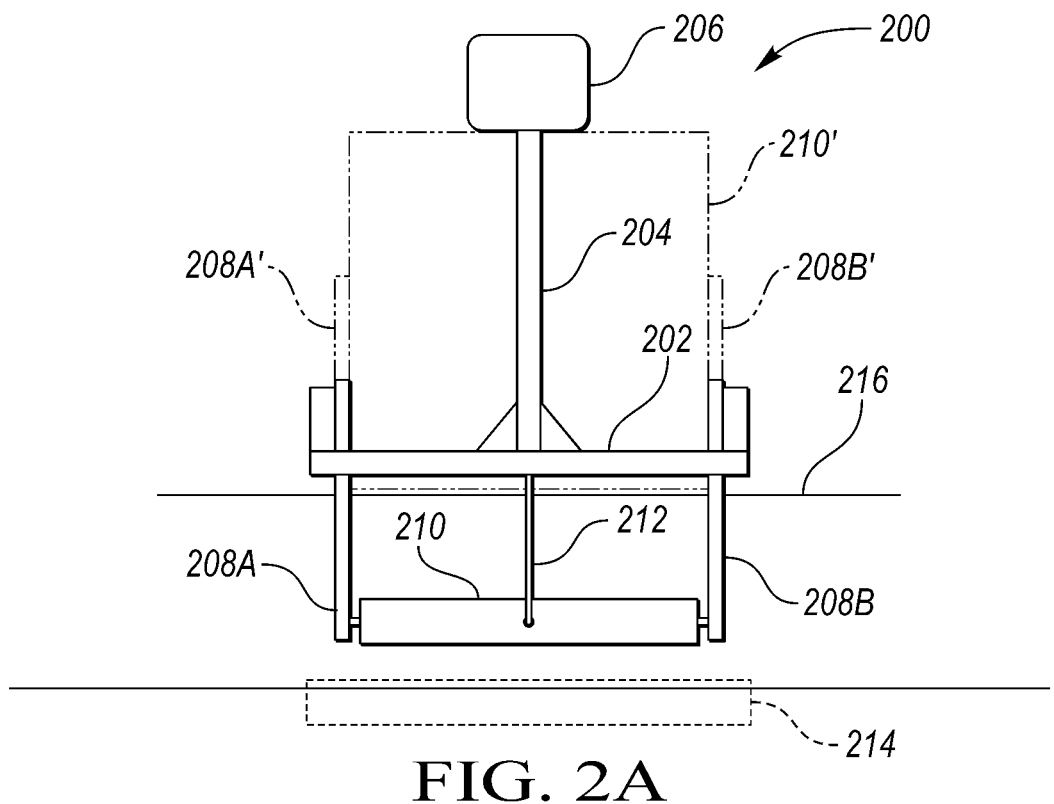
FIG. 2A is an exemplary rear view illustration of an inductive charge plate receiver assembly in a deployed and retracted position.

FIG. 2A is an exemplary rear view illustration of an inductive charge plate receiver assembly 200 in a deployed position and retracted position. This exemplary assembly includes a frame 202, a track 204 attached to the frame 202, and an actuator 206. The actuator may be electric, hydraulic or pneumatic. Examples of an electric actuator also referred to as an electric machine include an electric motor, a solenoid, and a linear actuator. The actuator 206 is operatively coupled with the track 204 and swing arm 208 to facilitate movement of a charge plate receiver 210 between a storage position and a deployed position via the use of a linking member 212. The frame 202 may be a ridged structure of the vehicle having mounting brackets to attach the other members. This assembly may be configured to form a four-bar system in which the frame 202 forms the foundation, the track 204 and actuator 206 form the crank, the swing arm 208 forms the rocker or follower, and the charge plate receiver 210 forms the coupler or connecting rod. Other embodiments may include a 5-bar linkage, a 6-bar linkage or other linkage structure. The use of the linkage structure provides for a mechanism to deploy the charge plate receiver below a vehicle clearance line 216. The vehicle clearance level 216, also referred to as a vulnerable line, is a predetermined distance above a horizontal plane upon which the vehicle's wheels travel. When the assembly is in the deployed position, the charge plate 210 is oriented such that a major plane of the receiver plate 210 is parallel with a charge plate transmitter 214. The charge plate transmitter 214 is typically mounted in the ground such that the charge plate transmitter 214 and the charge plate receiver 210 are parallel with ground.

When in the retracted position, the charge plate receiver 210' and the swing arms 208A' and 208B' are above the vehicle clearance level 216. The charge plate receiver 210' is in an on-end orientation when in the retracted position. The on-end orientation may include an orientation perpendicular to ground, or an angle typically greater than 45 degrees from ground. An on-side orientation of the charge plate receiver 210 is rotated from the on-end orientation. The transition from on-end to on-side includes a rotation in the orientation of the charge plate receiver 210 of approximately 90 degrees as the charge plate receiver 210' moves from the deployed to retracted position. The charge plate receiver 210' is primarily a coil of copper but may include other conductive and ferromagnetic materials, and is shown as square, however it may be rectangular, circular, or other shapes.

Figure 2B:
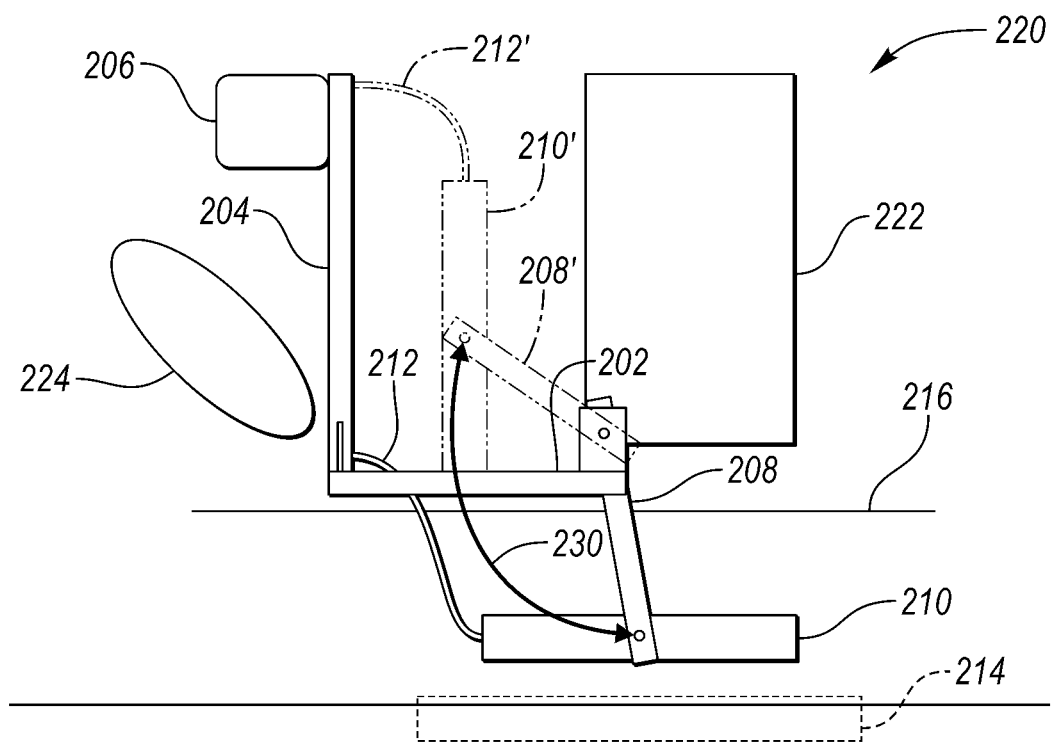
FIG. 2B is an exemplary side view illustration of an inductive charge plate receiver assembly in a deployed and retracted position.

FIG. 2B is an exemplary side view illustration of an inductive charge plate receiver assembly 220 in a deployed position and retracted position. This exemplary assembly includes a frame 202, a track 204 attached to the frame 202, and an actuator 206. The actuator may be electric, hydraulic or pneumatic. Examples of an electric actuator also referred to as an electric machine include an electric motor, a solenoid, and a linear actuator. The actuator 206 is operatively coupled with the track 204 and swing arm 208 to facilitate movement of a charge plate receiver 210 between a storage position and a deployed position via the use of a linking member 212. The frame 202 may be a rigid structure of the vehicle having mounting brackets to attach the other members. This assembly may be configured to form a four-bar system in which the frame 202 forms the foundation, the track 204 and actuator 206 form the crank, the swing arm 208 forms the rocker or follower, and the charge plate receiver 210 forms the coupler or connecting rod. Other embodiments may include a 5-bar linkage, a 6-bar linkage or other linkage structure. The use of the linkage structure provides for a mechanism to deploy the charge plate receiver below a vehicle clearance line 216. The vehicle clearance level 216, also referred to as a vulnerable line, is a predetermined distance above a horizontal plane upon which the vehicle's wheels travel. When the assembly is in the deployed position, the charge plate 210 is oriented such that a major plane of the receiver plate 210 is parallel with a charge plate transmitter 214. The charge plate transmitter 214 is typically mounted in the ground such that the charge plate transmitter 214 and the charge plate receiver 210 are parallel with ground.

When in the retracted position, the charge plate receiver 210' and the swing arms 208A' and 208B' are above the vehicle clearance level 216. The charge plate receiver 210' is in an on-end orientation when in the retracted position. The on-end orientation may include an orientation perpendicular to ground, or an angle typically greater than 45 degrees from ground. The transition from on-end to on-side may include a rotation in the orientation of the charge plate receiver 210 of approximately 90 degrees as the charge plate receiver 210 moves from the deployed to retracted position. When the charge plate receiver is in the retracted position 210', it may be drawn into a cavity defined by underbody components. The underbody components may include a suspension and/or drivetrain area 222 and a muffler area 224. The assembly may be configured such that the charge plate receiver 210' is adjacent to the area 222 while in the retracted position, and the charge plate receiver 210 travels along an arc 230 to swing under the area 222 while in the deployed position. The orientation of the assembly may be such that the arc 230 is oriented similar to the arc 114 of FIG. 1 such that the charge plate receiver may be adjacent to powertrain components including an engine, a transmission, a drive shaft, or an electric machine when the assembly is retracted, not intersecting the median plane 108 of the vehicle. And the charge plate receiver may be underneath the powertrain component when the assembly is deployed thus intersecting the median plane 108 of the vehicle. In another embodiment, the orientation of the assembly may be such that the arc 230 is oriented similar to the arc 116 of FIG. 1: the charge plate receiver when retracted may be adjacent to powertrain components including a rear axle or differential and the cavity may be between the powertrain component and a trunk of the vehicle or a muffler 224. And the charge plate receiver may be under the powertrain component 222 when deployed.

Figure 3:
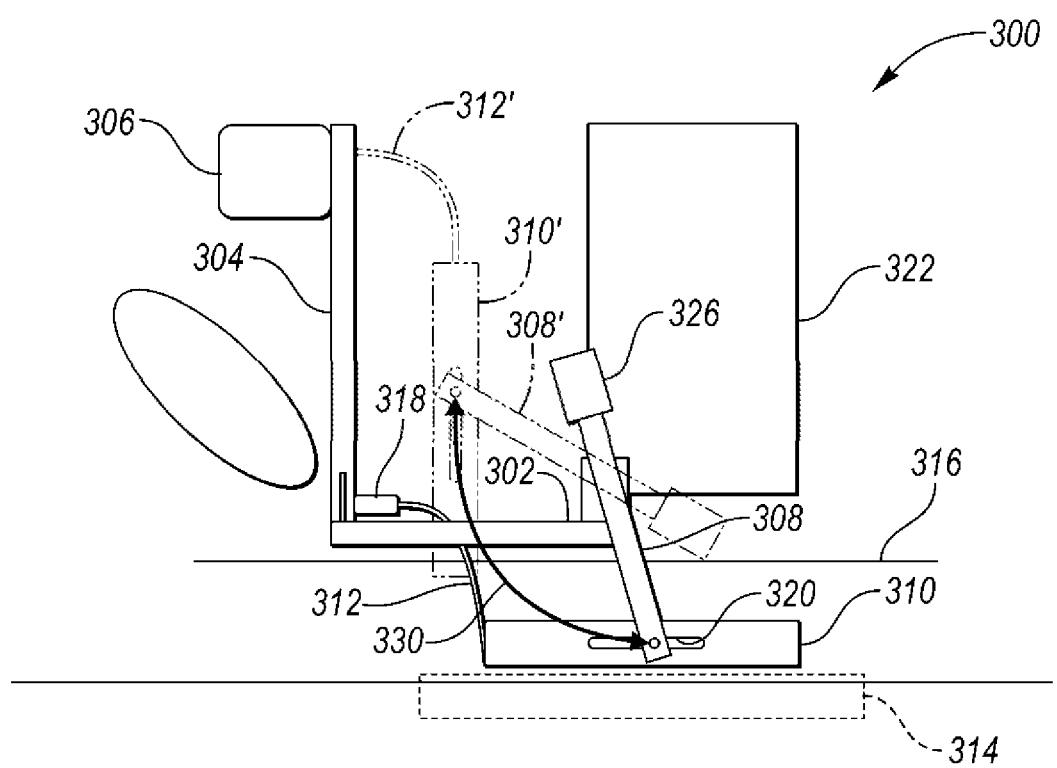
FIG. 3 is an exemplary side view illustration of an alternative inductive charge plate receiver assembly in a deployed and retracted position.

FIG. 3 is an exemplary side view illustration of an alternative inductive charge plate receiver assembly in a deployed and retracted position. This exemplary assembly includes a frame 302, a track 304 attached to the frame 302, and an actuator 306. The actuator may be electric, hydraulic or pneumatic. Examples of an electric actuator also referred to as an electric machine include an electric motor, a solenoid, and a linear actuator. The actuator 306 is operatively coupled with the track 304 and swing arm 308 to facilitate movement of a charge plate receiver 310 between a storage position and a deployed position via the use of a linking member 312. The frame 302 may be a ridged structure of the vehicle having mounting brackets to attach the other members. This assembly may be configured to form a four-bar system in which the frame 302 forms the foundation, the track 304 and actuator 306 form the crank, the swing arm 308 forms the rocker or follower, and the charge plate receiver 310 forms the coupler or connecting rod. Other embodiments may include a 5-bar linkage, a 6-bar linkage or other linkage structure. The use of the linkage structure provides for a mechanism to deploy the charge plate receiver below a vehicle clearance line 316. The vehicle clearance level 316, also referred to as a vulnerable line, is a predetermined distance above a horizontal plane upon which the vehicle's wheels travel. When the assembly is in the deployed position, the charge plate 310 is oriented such that a major plane of the receiver plate 310 is parallel with a charge plate transmitter 314. The charge plate transmitter 314 is typically mounted in the ground such that the charge plate transmitter 314 and the charge plate receiver 310 are parallel with ground. The assembly 300 may include a linear actuator 318. When the charge plate 310 is deployed, the linear actuator 318, such as a cylindrical cam, may be used to adjust the position of the charge plate receiver 310 with respect to the charge plate transmitter 314. The linear actuator 318 may cooperate with a sliding mechanism 320 to facilitate horizontal translation of the charge plate receiver 310. The assembly 300 may also include a linear actuator 326 used to provide vertical translation of the charge plate receiver 310. Vertical translation may enable the assembly 300 to position the charge plate receiver 310 closer to the charge plate transmitter 314 to increase the efficiency of the transmission of energy between the transmitter 314 and the receiver 310.

When in the retracted position, the charge plate receiver 310' and the swing arm 208' are above the vehicle clearance level 316. The charge plate receiver 310' is in an on-end orientation when in the retracted position. The on-end orientation of the charge plate receiver 310 in this illustration is rotated from an on-side orientation also referred to as a horizontal orientation when in the deployed position. The transition from on-end to on-side includes a rotation in the orientation of the charge plate receiver 310 of approximately 90 degrees as the charge plate receiver 310' moves from the deployed to retracted position. The charge plate receiver 310' is shown as square, however it may be rectangular, circular, or another shape.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A vehicle comprising:
an inductive charge plate assembly mounted within a cavity of the vehicle and including
a swing arm pivotally secured to a mounting surface, and
a charge plate pivotally secured to the swing arm such that the charge plate changes orientation from on-end to on-side when the assembly moves between a retracted position within the cavity and a deployed position under the cavity.

2. The vehicle of claim 1 further comprising an electric machine configured to move the assembly between the retracted and deployed positions.

3. The vehicle of claim 1, wherein the charge plate receiver includes a planar surface and the planar surface is generally parallel to a horizontal plane of the vehicle when the assembly is in the deployed position.

4. The vehicle of claim 3, wherein the charge plate receiver is offset from a median plane of the vehicle when the assembly is in the retracted position and the charge plate receiver intersects the median plane when the assembly is in the deployed position.

5. The vehicle of claim 3, wherein the planar surface is generally perpendicular to the horizontal plane of the vehicle when the assembly is in the retracted position.

6. The vehicle of claim 3, wherein the assembly further includes a drive arm, and wherein the assembly is a four-bar linkage.

7. The vehicle of claim 6, wherein the swing arm and the drive arm each include a linear actuator.

8. The vehicle of claim 3, wherein the charge plate receiver is laterally adjacent to a vehicle component when the assembly is in the retracted position and the charge plate receiver is partially under the vehicle component when the assembly is in the deployed position.

9. A vehicle comprising:
an inductive charge plate assembly including
a swing arm pivotally secured to a mounting surface and
a charge plate receiver, including a planar surface, pivotally secured to the swing arm such that the charge plate receiver is disposed within a cavity defined by an under-body of the vehicle when the assembly is retracted, and travels along an arc defined by a length of the swing arm when the assembly moves between retracted and deployed positions, wherein the planar surface is generally parallel to a horizontal plane of the vehicle when the assembly is in the deployed position and wherein the planar surface is generally perpendicular to the horizontal plane of the vehicle when the assembly is in the retracted position.

10. The vehicle of claim 9, further including an electric machine configured to move the assembly between the retracted and deployed positions.

11. The vehicle of claim 9, wherein the inductive charge plate assembly further includes a drive arm, and wherein the inductive charge plate assembly forms a four-bar linkage.

12. The vehicle of claim 9, wherein the cavity is offset from a median plane of the vehicle such that the charge plate receiver does not intersect the median plane when the assembly is in the retracted position and the charge plate receiver intersects the median plane when the assembly is in the deployed position.

13. The vehicle of claim 9, wherein the cavity is adjacent to a trunk of the vehicle.

* * * * *